US007328442B2

(12) United States Patent
Porter

(10) Patent No.: US 7,328,442 B2
(45) Date of Patent: Feb. 5, 2008

(54) ROBOTIC CORNER NEGOTIATING SYSTEMS AND METHODS FOR AUTOMATED STORAGE LIBRARIES

(75) Inventor: Ryan S. Porter, Monument, CO (US)

(73) Assignee: Quantum Corporation, San Jose, CA (US)

( * ) Notice: Subject to any disclaimer, the term of this patent is extended or adjusted under 35 U.S.C. 154(b) by 385 days.

(21) Appl. No.: 11/083,681

(22) Filed: Mar. 17, 2005

(65) Prior Publication Data
US 2006/0212886 A1    Sep. 21, 2006

(51) Int. Cl.
G11B 17/22    (2006.01)
G11B 15/68    (2006.01)

(52) U.S. Cl. ........................................ 720/632; 360/92
(58) Field of Classification Search ............. 369/30.43, 369/30.45, 30.72, 30.85; 360/92; 720/632
See application file for complete search history.

(56) References Cited

U.S. PATENT DOCUMENTS

| 5,293,284 | A  | * | 3/1994  | Sato et al. ..................... 360/92 |
| 5,631,785 | A  | * | 5/1997  | Dang et al. .................... 360/92 |
| 5,899,657 | A  | * | 5/1999  | Hodges ....................... 414/609 |
| 6,155,766 | A  | * | 12/2000 | Ostwald et al. ............. 414/279 |
| 6,222,699 | B1 | * | 4/2001  | Luffel et al. ................... 360/92 |
| 6,327,113 | B1 |   | 12/2001 | Mueller et al. |
| 6,496,325 | B1 |   | 12/2002 | Kersey et al. |
| 6,498,771 | B1 | * | 12/2002 | Boyce et al. ............. 369/30.34 |
| 6,539,876 | B1 | * | 4/2003  | Campbell et al. ...... 104/130.01 |
| 6,550,391 | B1 |   | 4/2003  | Ostwald et al. |
| 6,661,602 | B2 |   | 12/2003 | Benson et al. |
| 6,671,580 | B2 | * | 12/2003 | Campbell et al. ........... 700/245 |
| 6,693,758 | B2 | * | 2/2004  | Patterson et al. ............. 360/69 |
| 6,693,759 | B2 | * | 2/2004  | Owens et al. ................. 360/69 |
| 6,718,228 | B2 | * | 4/2004  | Campbell et al. ........... 700/214 |
| 6,751,040 | B2 | * | 6/2004  | Gupta et al. .................. 360/69 |
| 6,851,909 | B2 | * | 2/2005  | Campbell et al. ........... 414/268 |
| 6,922,307 | B2 | * | 7/2005  | Ostwald et al. ............... 360/92 |
| 7,255,525 | B2 | * | 8/2007  | Smith et al. ................ 414/273 |

(Continued)

FOREIGN PATENT DOCUMENTS

EP        1107245 A1  *  6/2001

(Continued)

OTHER PUBLICATIONS

European Search Report mailed Sep. 8, 2006 for European Patent Application No. 06251432.8, three pages.

Primary Examiner—William J. Klimowicz
(74) Attorney, Agent, or Firm—Morrison & Foerster LLP

(57) ABSTRACT

In one aspect of the invention, an apparatus for transferring storage cartridges within an automated storage library is provided. The apparatus includes a sled and a track for supporting and guiding the sled. The track includes a corner portion wherein the sled moves through the corner portion without changing the orientation of the sled relative to the track and storage library system. The corner portion may include a 90 degree turn. The sled may further include a gripper mechanism for handling storage cartridges. The gripper mechanism may rotate relative to the sled to access various storage device interface positions adjacent the track. In another example, the apparatus may further include a motor located remotely from the track and coupled to the sled via a cable pulley system, which drives the sled through the corner portion.

20 Claims, 10 Drawing Sheets

U.S. PATENT DOCUMENTS

| | | | |
|---|---|---|---|
| 2001/0008473 A1* | 7/2001 | Schmidtke et al. | 360/92 |
| 2002/0057514 A1* | 5/2002 | Patterson et al. | 360/69 |
| 2002/0057515 A1* | 5/2002 | Owens et al. | 360/69 |
| 2002/0085307 A1 | 7/2002 | Helmick et al. | |
| 2002/0085308 A1 | 7/2002 | Paulat | |
| 2002/0085458 A1 | 7/2002 | Luffel et al. | |
| 2002/0149870 A1 | 10/2002 | Steinhilber | |
| 2003/0002202 A1* | 1/2003 | Smith et al. | 360/92 |
| 2003/0002203 A1* | 1/2003 | Gustafson et al. | 360/92 |
| 2003/0002204 A1* | 1/2003 | Ostwald et al. | 360/92 |
| 2003/0076619 A1* | 4/2003 | Gariepy et al. | 360/92 |
| 2003/0123300 A1* | 7/2003 | Campbell et al. | 365/200 |
| 2003/0125833 A1* | 7/2003 | Campbell et al. | 700/214 |
| 2003/0125834 A1* | 7/2003 | Campbell et al. | 700/214 |
| 2003/0125838 A1* | 7/2003 | Campbell et al. | 700/245 |
| 2004/0008445 A1 | 1/2004 | Vanderheyden | |
| 2004/0253081 A1* | 12/2004 | Campbell et al. | 414/277 |

FOREIGN PATENT DOCUMENTS

| | | | |
|---|---|---|---|
| JP | 08013913 A | * | 1/1996 |

* cited by examiner

ROBOTIC CORNER NEGOTIATING SYSTEMS AND METHODS FOR AUTOMATED STORAGE LIBRARIES

BACKGROUND OF THE INVENTION

1. Field

The present invention relates generally to systems and methods associated with automated storage libraries, and more particularly to systems and methods for maneuvering storage device handling mechanisms within automated storage libraries.

2. Description of Related Art

Magnetic tape cartridges have proven to be an efficient and effective medium for data storage in computer systems. Large computer systems may utilize numerous cartridges for data storage purposes as well as a plurality of tape drives for inputting and outputting data to and from storage cartridges in a timely manner. Typically, as the number of storage cartridges grows they are organized in automated storage libraries. Automated storage libraries including, e.g., magnetic tape cartridges, may improve access speed and reliability of data storage systems having large numbers of magnetic tape cartridges.

Automated storage libraries generally include a plurality of storage bins or slots for storing storage devices (e.g., magnetic, optical, etc.), a robotic storage device picker mechanism (often referred to as a "gripper" or "hand"), and one or more media drives. The robotic picker may be controlled to select a specific storage device from the library and transfer the storage device between a storage slot and a media drive within seconds. The robotic picker typically includes a gripper or hand mechanism for handling the storage devices. For example, the robotic picker may position the gripper near a desired storage device and activate the gripper to engage or grip the storage device to remove the storage device from the storage bin. In other examples, a finger or hook may be used to engage and drag the storage device into or onto the transfer mechanism. The robotic arm may move the gripper and storage cartridge to a location to load the storage cartridge into a media drive, load port (for adding or removing tapes from the library), and the like.

Generally, storage device slots, media drives, access doors, and the like are arranged within a library housing to maximize the storage capacity for a given housing size. As a result, the picker mechanism generally moves in three dimensions when transferring storage devices between storage slots, media drives, and access doors. For example, the picker mechanism may move along a track in the x and y dimensions (on a plane parallel to the base), where the track includes one or more turns. The track may further rise in the vertical direction, the z-dimension, thereby allowing the picker mechanism three degrees of movement.

The density at which storage slots, media drives, and the like may be disposed within the library housing relies, at least in part, on the ability of the picker mechanism of the storage library to maneuver and access the storage slots, media drives, and the like. Typically, the gripper or hand is mounted on a sled or stage which moves along the track. In some examples, the sled rotates to negotiate and move through one or more corner or curved portions of the track as described, e.g., in U.S. Patent Publication No. 2002/014, 9870. In other examples, the track itself may rotate to move the sled along different directions as described, e.g., in U.S. Pat. No. 6,496,325. During rotation of the sled and/or track in the corner portions, however, the gripper mechanism generally cannot access storage slots, media drives, and the like, resulting in a loss of usable space ("dead space") within the library housing.

Additionally, conventional sleds are translated along a track with one or more motors. Generally, the motor is mounted with the sled resulting in a significant amount of vertical space occupied by the transport mechanism and added weight to the sled. Further, in some examples, multiple motors are used, e.g., a separate motor for moving the sled along each axis.

Accordingly, conventional transport systems and methods for controlling a gripper mechanism often have a significant turning radius, significant vertical real estate to provide a driving source that moves with the sled, and/or multiple motors (one for each axis). Any of these features may lead to losses in storage capacity for a given storage library size. For example, a large turning radius effectively eliminates useful service locations that could have existed within the radius. Excessive vertical real estate for a drive source generally compromises the ability to achieve high tape densities as well as force/speed margins because of efforts to keep the mechanism height to a minimum. Additionally, multiple motors to move the gripper mechanism may increase the cost and complexity of the system.

BRIEF SUMMARY

In one aspect, an apparatus for transferring storage cartridges within an automated storage library is provided. The apparatus includes a sled and a track for supporting and guiding the sled. The track includes a corner portion wherein the sled moves through the corner portion without changing the orientation of the sled relative to the automated storage library or the track. For example, the sled does not rotate through the corner portion, but rather moves into the corner and the moves sideways along the new direction. The sled may include a gripper mechanism for handling storage cartridges. The gripper mechanism may rotate relative to the sled to access various storage device interface positions adjacent the track. The apparatus may further include a motor located remotely from the track and coupled to the sled via a motor driven belt or cable pulley system.

In one example, the sled may include a plurality of cam followers that engage guide rails associated with the track. The guide rails may include various openings and guide members at the corner to allow the cam followers to guide the sled along a first linear direction into the corner and then along a second linear direction out of the corner. In one example, five cam followers are used for added stability of the sled through the corner. Additionally, various other guide elements may be used to ensure engagement between the sled and the track throughout the corner portion.

The sled may be driven by a motor driven belt system, where the belt is attached to the sled by a pin (or other suitable element) located near the center of the sled. A pulley of the motor driven belt system may be located at the corner and include a notch or slot to accommodate the pin (or other fastening element) as the sled passes through the corner of the track. The turning radius of the sled may therefore be reduced to the pitch radius of the corner pulley. In one example, the turning radius of the sled as it negotiates the corner portion of the track is less than 20 mm, in another example less than 7 mm, in another example less than 1 mm, and in another example approximately equal to 0 mm. The reduced turning radius may allow greater access for an associated gripper mechanism in and around the corner portion of the track.

According to another aspect, an automated storage library system is provided. In one example, the automated storage library system includes a housing and a transport mechanism disposed within the housing, the transport mechanism for transporting storage devices. The transport mechanism includes a gripper mechanism, a sled, and a track for guiding the sled within the housing. The track includes a corner portion wherein the sled moves through the corner portion without changing the orientation of the sled relative to the library system housing.

According to another aspect, a method for transporting storage cartridges and negotiating a corner within a storage library system is provided. The exemplary method includes moving a sled along a track having a corner portion, wherein the sled is moved through the corner portion without changing the orientation of the sled relative to the track.

The present invention and its various embodiments are better understood upon consideration of the detailed description below in conjunction with the accompanying drawings and claims.

DETAILED DESCRIPTION OF THE INVENTION

Figure 1:
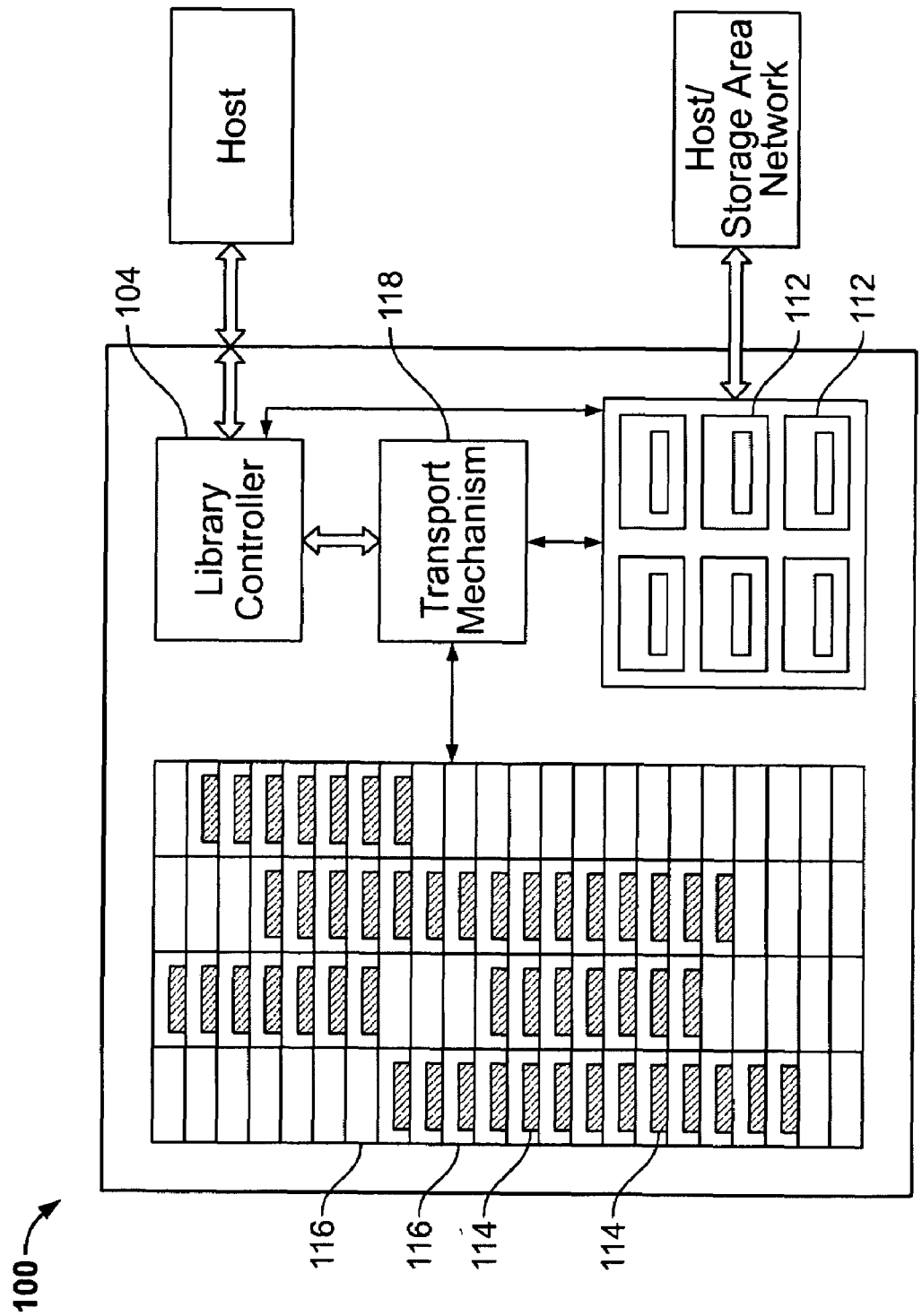
FIG. 1 illustrates an exemplary automated storage library system.

Exemplary systems and methods described herein relate generally to systems for maneuvering a storage device manipulation apparatus, e.g., a gripper or hand device, to various positions along a path that includes various cartridge interface devices such as media drives (for reading/writing data), magazines (for portable device storage), fixed slots (for non-portable device storage), and a transport station (for transporting a storage device to another library device such as an elevator or the like). The following description is presented to enable a person of ordinary skill in the art to make and use various aspects of the invention. Descriptions of specific materials, techniques, and applications are provided only as examples. Various modifications to the examples described herein will be readily apparent to those of ordinary skill in the art, and the general principles defined herein may be applied to other examples and applications without departing from the spirit and scope of the invention. Thus, the present invention is not intended to be limited to the examples described and shown, but is to be accorded the scope consistent with the appended claims.

According to one aspect described herein, systems and methods for maneuvering a gripper mechanism along a track within a storage library are provided. The track includes at least one corner, e.g., a 90 degree turn, allowing a sled that supports the gripper mechanism to translate along two axes. In one example, the sled moves through the corner of the track without changing the orientation of the sled to the track and storage library, e.g., without rotating through the corner.

Additionally, in one example, the turning or cornering radius of the sled through the corner is reduced relative to conventional designs thereby allowing the gripper mechanism increased access to device locations within the corner. For example, the turning radius may be equal or less than 20 mm. A reduced turning radius generally allows increased access within the corner and may thereby reduce unused or "dead space" within the storage library and increase the storage capacity of the storage library for a given storage library housing size compared with conventional transport systems.

Additionally, in one example, a single motor may be used to move the sled along the track via a belt or cable pulley system and control access to at least two degrees of freedom at reduced cost and complexity to the system. For example, the motor may be placed remotely from the sled and trajectory of the sled through the library system, thereby reducing the vertical profile of the transport system.

Various examples described herein allow for efficient use of nearly all the space along the trajectory of the sled, particularly in the corner positions, where traditional turning radii prohibit efficient access to device interface positions located in and near the corner positions. Further, the exemplary systems may include a single, remote motor, which occupies reduced vertical space such that the system can access positions low to the base or floor of the available volume within the library housing.

A gripper or hand mechanism may be attached to the sled and configured to rotate, e.g., 180 degrees or more relative to the sled to access various storage device positions. The gripper mechanism may include any suitable mechanism for engaging storage devices, e.g., two opposing gripper fingers having a proximal end pivotally mounted to the picker frame and a distal end adapted to engage minor and/or major surfaces of a storage device.

The examples described herein are generally described with respect to a magnetic tape library including multiple magnetic tape cartridges. It should be understood, however, this description is illustrative only and the aspects and examples described are contemplated for use with other types of storage media and storage media libraries. For example, a storage library may include optical media devices alone or in combination with magnetic media storage devices and the like.

FIG. 1 is a schematic illustration of an exemplary automated storage library system 100 for the storage and retrieval of a plurality of storage cartridges 114 storage herein. Library system 100 includes one or more media drives 112, a plurality of storage devices or cartridges 114 stored in bins or storage slots 116, and a transport mechanism 118 that may be equipped with a corner negotiating system as described herein. The transport mechanism 118 includes an exemplary gripper/hand mechanism (not shown) for transporting a selected cartridge 114, for example, between a drive 112 and a storage slot 116. Storage library system further includes a library controller 104 that communicates with a host processor or computer network to control the actions of transport mechanism 118 and drives 112 to retrieve and/or store data.

Library controller 104 may include a single general purpose computer, microprocessor, microcontroller, and the like. Alternatively, a separate cartridge loader controller and a library system controller may be included. A general library controller 104, tape cartridge loader controller, or library controller may include any programmable general purpose computer or processor and preferably will have a suitably programmed microprocessor or microcontroller.

The input-output connections between the library controller and various other components of the library system 100 may include well-known industry standard cabling and communication protocols. For example, Ethernet, Inter-Integrated Circuit bus (I2C), Small Computer System Interface (SCSI), ultra-wide SCSI, fast SCSI, fibre channel, and the like.

Library controller 104 operates to coordinate movements and actions of media drives 112, robotic transport mechanism 118, and the like. The controller 104 may include a suitable processor as described above and is typically interconnected with a host processor, which sends access commands to controller 104. In this example, information recorded to or read from one or more of the cartridges 114 is transmitted between one of the drives 112 to the host or a storage area network through a second data path connection, e.g., a fibre channel bridge or the like.

Media drives 112 may include, for example, magnetic tape drives and/or optical disk drives, and cartridges 114 may include, for example, magnetic and/or optical storage devices. An exemplary drive includes the SDLT™ 320 magnetic tape drive, and an exemplary storage cartridge includes the Super DLTape™ Type I storage cartridge both sold by Quantum Corporation. It should be understood, however, that other storage devices and media drives may be used.

Automated storage library system 100 may further include various other features such as load ports for manually adding and removing cartridges to and from the library, various access doors, control panels, power supplies, and the like as are known in the art. For clarity, however, such additional features have been omitted from the description.

Figure 2:
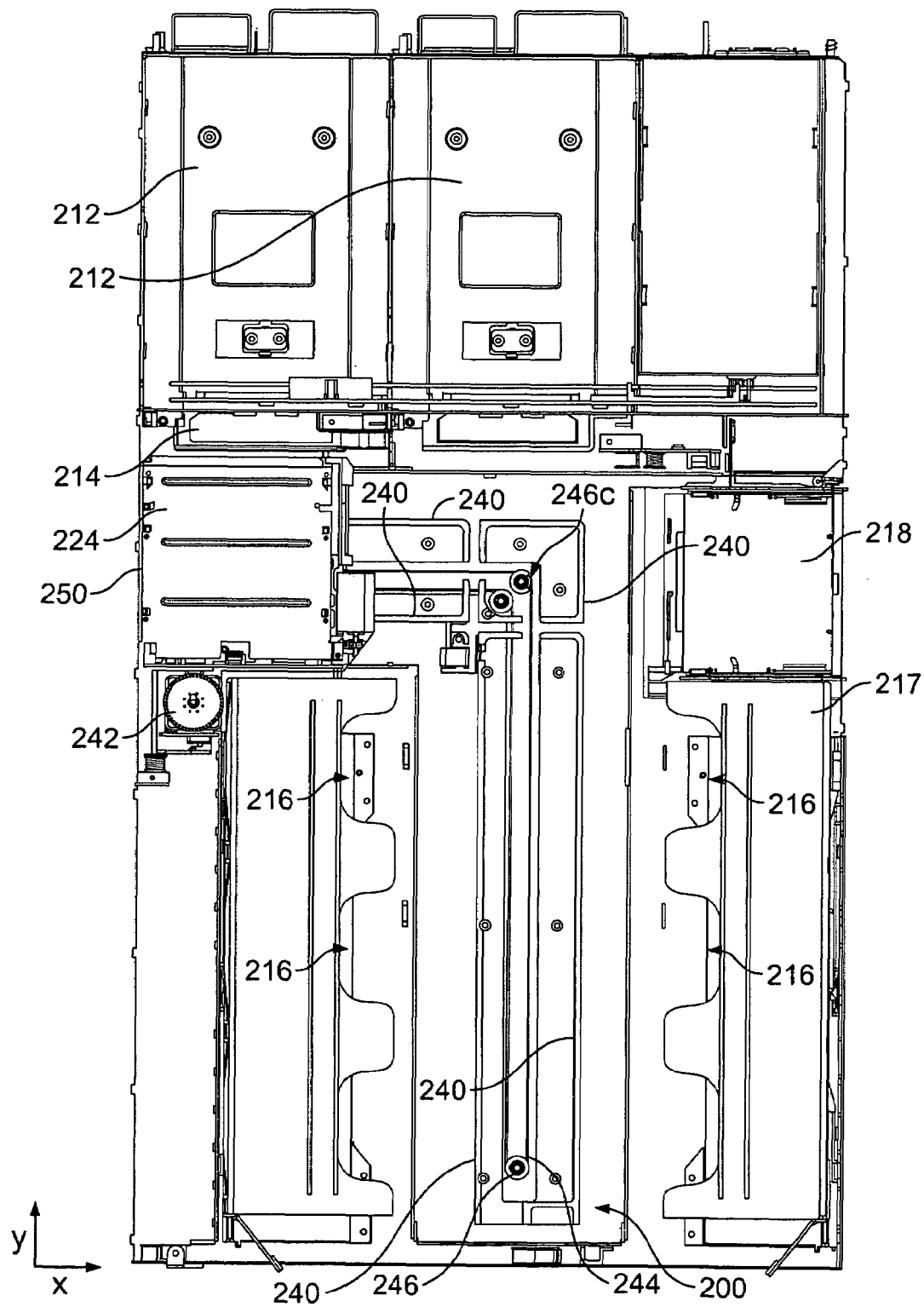
FIG. 2 illustrates an exemplary automated storage library including a transport mechanism for moving a gripper mechanism in two dimensions.

FIG. 2 illustrates an exemplary transport system for use within a storage library according to one example. In particular, FIG. 2 illustrates a top view of an exemplary transport system 200 within a storage library housing, and shows various devices that may be serviced by gripper assembly 224, sometimes referred to as a "hand" or "picker." The exemplary storage library generally includes storage bins 216, media drives 212, pass-through 218, and transport system 200. Storage bins 216 are arranged in magazines 217 facing an interior of the library housing. Transport system 200 is disposed between and adjacent to storage bins 216 and capable of transferring gripper assembly 224 to an appropriate position to retrieve or place a storage device from or with storage bin 216. Media drives 212 include receivers 213 for receiving storage cartridges 214 therein; however, receivers 213 are not oriented along the same axis as storage bins 216. Accordingly, transport system 200 includes a turn or corner in the track where sled 250 (including gripper assembly 224) changes direction to move along the x and y axes.

Gripper assembly 224 includes a cartridge manipulator that is transported to the various positions with the storage library by the transport system 200. Gripper assembly 224 also has a rotational degree of freedom, controlled by a motor on sled 250, which allows it to rotate relative to sled 250 (e.g., by engaging castellations shown more clearly in FIGS. 3A-3C). Gripper assembly 224 may rotate 180 degrees or more to access various positions along the track.

Gripper assembly 224 is attached to sled 250, which is supported by a track including guide members 240 (e.g., guide rails or the like) and driven along guide members 240 via a belt drive system. The belt drive system may include a belt or cable 244 that is pulley-driven remotely by motor 242 disposed outside the trajectory of sled 250. Cable 244 may include any suitable belt, such as a synchronous or friction belt, cable, or other suitable coupling device. Cable 244 may negotiate the corner via a standard set of pulleys and idlers, including corner guide member 246c, which may include a notch or slot to accommodate a pin associated with the attachment of cable 244 to sled 250 (and which will be described in greater detail below). The diameter of corner guide member 246c can be relatively small, e.g., 20 mm or less. In another example, corner guide member 246c may be replaced by a pin or suitable contoured guide member.

In operation, sled 250 maintains a constant orientation with respect to the track and storage library when moving along the track through the storage library. For example, sled 250 does not rotate through the corner of the track to move along the x-axis and y-axis. Rather, sled 250 translates into the corner without rotation and then translates sideways at the corner along a new direction with the same orientation to the track as before the corner. In particular, sled 250 is supported and guided by guide members 240 as sled 250 is driven by cable 244 toward the corner portion. Guide members 240 are disposed in the corner portion of the track substantially rectilinearly (slight curves to accommodate corner pulley 246c diameter) with openings therein to allow sled 250 to be driven substantially linearly into the corner and then change direction, e.g., by 90 degrees, as the engagement point of the cable 244 and sled 250 passes corner pulley 246c. For example, with sled 250 positioned as shown in FIG. 2, belt 244 drives sled 250 to the right, in the x-axis direction toward the corner portion of transport mechanism 200. Sled 250 continues linearly until sled 250 (in particular, engagement members associated with sled 250) is aligned with openings in guide member 240, and the engagement point of cable 244 and sled 250 is aligned with corner pulley 246c. Thereafter, sled 250 is directed along the y-axis by cable 244, where guide members 240 are adapted to allow nearly rectilinear motion of sled 250 through the corner.

Figure 3A:
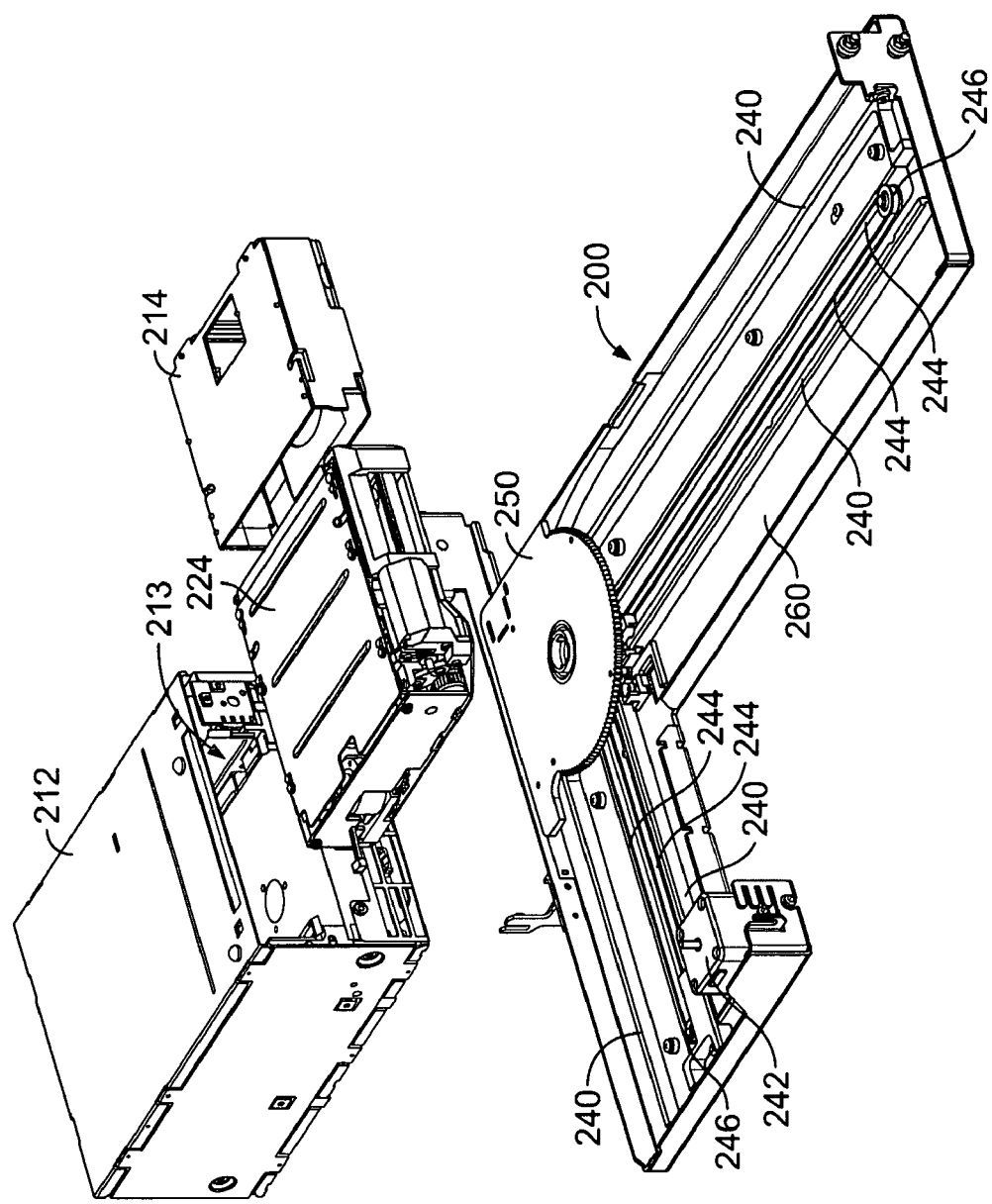
FIGS. 3A, 3B, and 3C illustrate perspective top and bottom views of a sled positioned at the corner of an exemplary track.
Figure 3B:
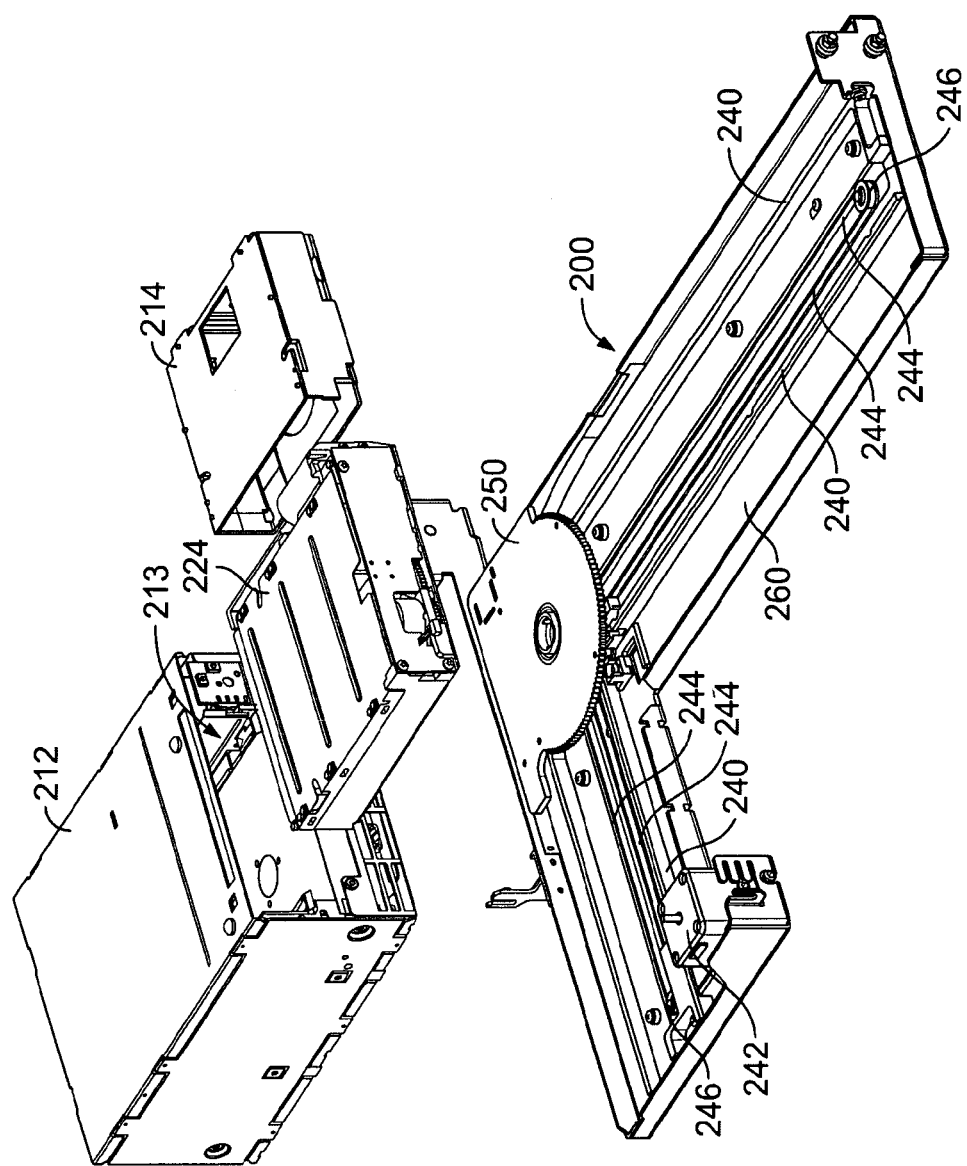
Figure 3C:
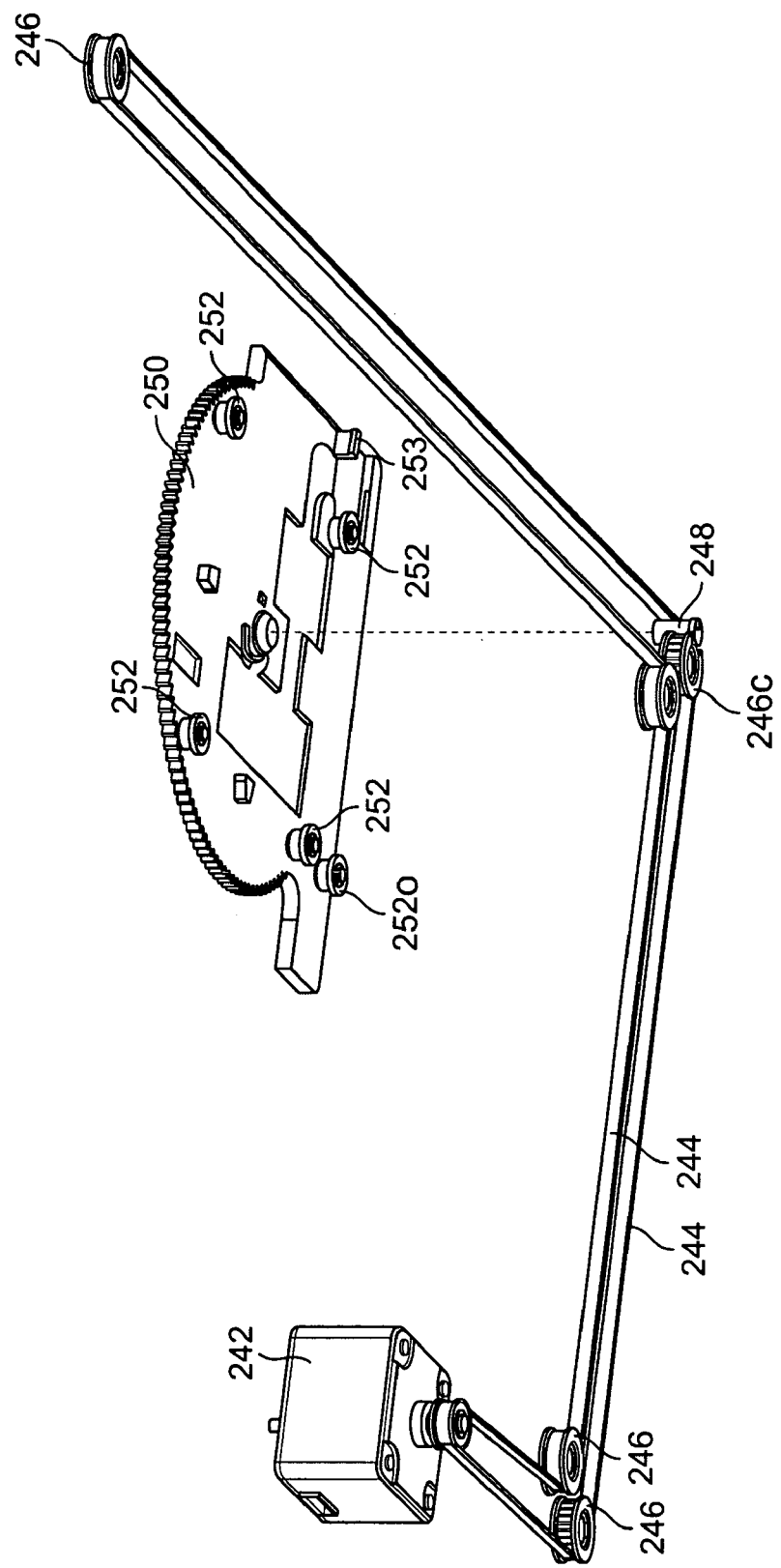
Figure 4A:
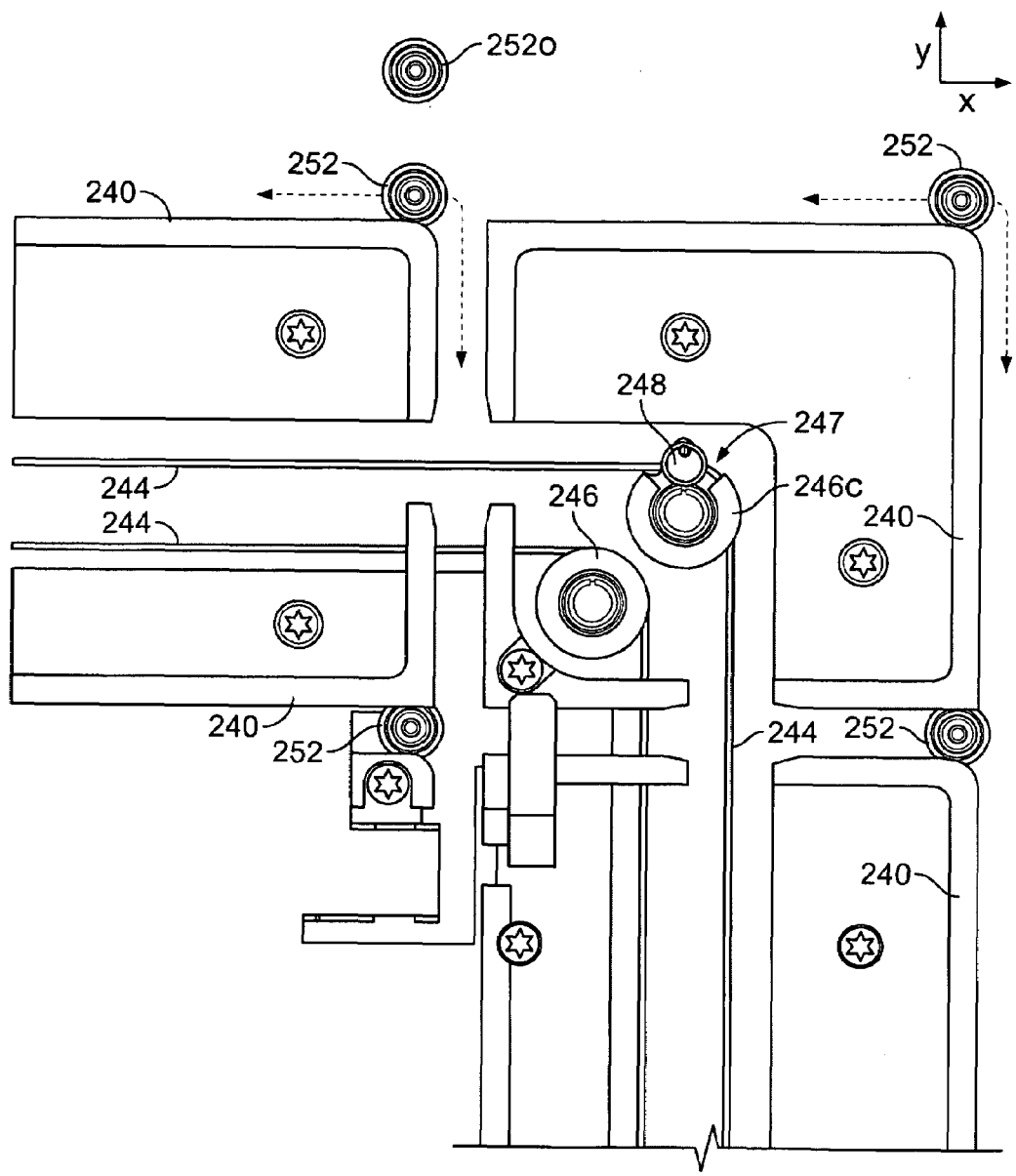
FIGS. 4A and 4B illustrate schematic views of sled positioned near a corner portion of a track.
Figure 4B:
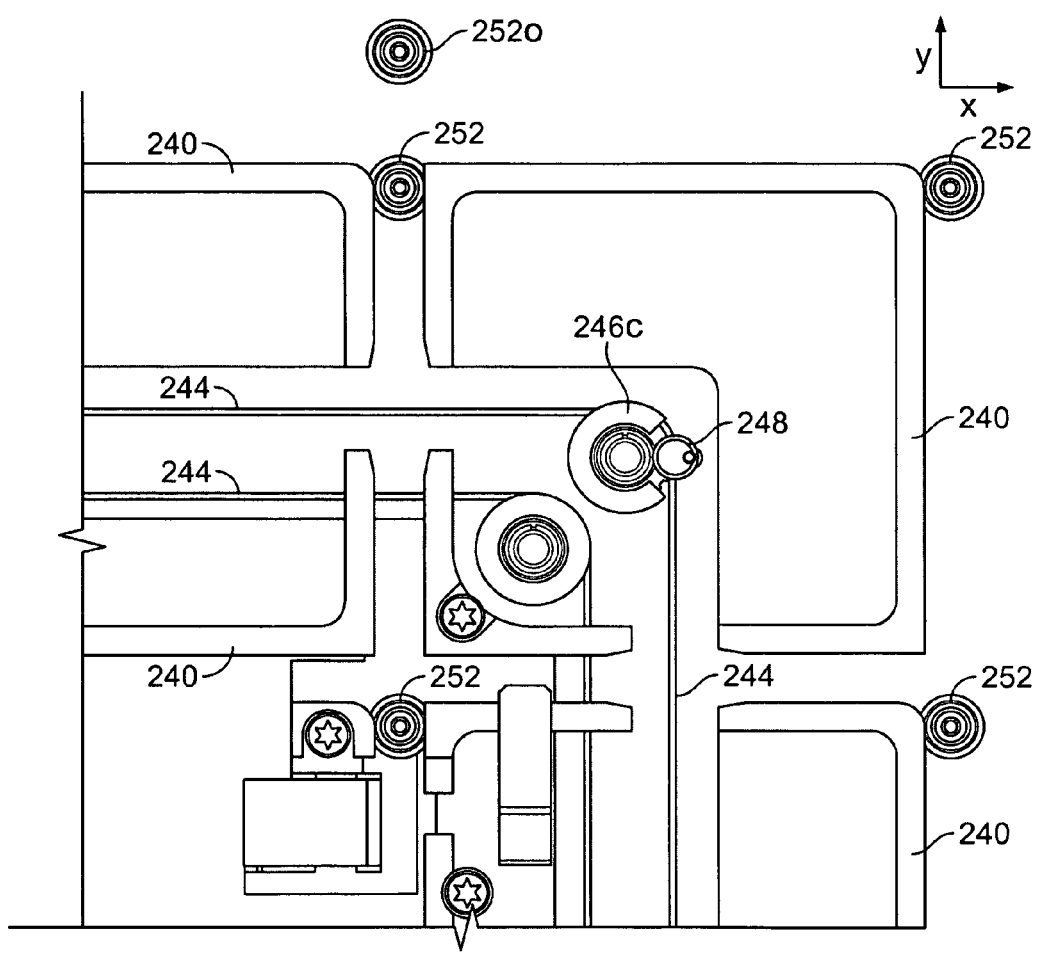

FIGS. 3A-3C, 4A, and 4B illustrate several views of an exemplary transport mechanism for moving a gripper/hand mechanism along two axes. FIGS. 3A-3C illustrate various exploded views of sled 250 positioned at the corner of the exemplary track and FIGS. 4A and 4B schematically illustrate the interaction of cam followers 252 with guide members 240 in the corner portion of the track. To aid in the illustration, cam followers 252 and pin 248 are shown without the sled in FIGS. 4A and 4B; it will be understood however that cam followers 252 and pin 248 are attached to a frame or structure associated with a sled 250 described herein.

As seen more clearly with reference to FIGS. 3A and 3B, the track generally includes one or more guide members 240, cable 244, and rotating members 246 for guiding cable 244 in the exemplary transport system. The underside of sled 250 includes a plurality of rollers or cam followers 252 to engage guide members 240. Additionally, a pin 248 is affixed to cable 244 and engages a portion of sled 250 such that movement of cable 244 (according to motor 242) results in movement of sled 250 along the track. The track may be mounted or formed integral with a platform or frame 260, which may be raised vertically within the storage library as is known in the art. Additionally, further mechanisms such as pulleys, motors, and the like for vertical and horizontal translation may be included to move gripper assembly 224 within the storage library system.

As cable 244 translates sled 250 to the corner, guide members 240 and rotating guide member 246c change the motion of the sled from the x-axis to the y-axis (or vice versa) as shown by the dotted arrows in FIG. 4A. Rotating guide member 246c is positioned at the corner such that sled 250 changes direction as pin 248 passes the rotating guide member 246c. Rotating guide member 246c may include a slot or indentation 247 to accommodate pin 248 (which may further reduce the turning radius of sled 250). Further, guide members 240 are configured and positioned to engage cam followers 252 and assist in guiding sled 250 as sled 250 moves through the corner portion.

The turning radius of sled 250 may generally be reduced to the size, i.e., pitch radius, of the corner guide member 246c and corresponding curved portions of guide members 240. Corner guide member 246c includes a pulley in this example, having a timed interface to engage the belt and pin 248. In one example, the corner guide member 246c has a diameter of 12.90 mm, resulting in a cornering or turning radius of approximately 6.45 mm. In other examples, the turning radius may be equal to or less than 20 mm, equal to or less than 6.5 mm, equal to or less than 1.0 mm, or approximately 0 mm. The turning radius may generally be reduced by using reduced diameter guide member 246c or "squared" guide members, e.g., a square pin, L-shaped guide member, or the like, positioned at the corner. Of course, larger turning radii are also possible depending on the particular application, design considerations, and the like. The relatively small turning radius allows gripper assembly 224 to access a media drive 212 near or at a maximum x-axis position and the pass-through 218 at or near a maximum y-axis position, both of which are located near the turning point of the track. Generally, conventional tracks for guiding sleds and gripper mechanisms have a large turning radius, and access to media drives and storage bin locations in this region is limited, e.g., due to swing clearance or the like, resulting in dead space within the storage library housing as described above.

Additionally, sled 250 may be controlled by a single motor 242. In this example, motor 242 is positioned adjacent the track away from the path of sled 250 along guide members 240. For example, the thickness of the track (along the vertical or z-axis) may be limited to the height of guide members 240, sled 250, and gripper mechanism 224. Accordingly, the position and operation of motor 252 allows for a very low-profile transport system. A reduced profile transport system may allow access to positions very low within the storage library housing and increase the storage capacity for a given housing size. The exemplary system also provides motion along two axes (x and y) with a single motor 242 (as opposed to two or more motors).

Those of ordinary skill in the art will recognize that the exemplary transport system depicted in FIGS. 2, 3A-3C is illustrative only and that various modifications are possible. For example, various guiding members, pulleys, idlers, rails, and the like may be substituted, added, or replaced for various applications and design considerations. For example, various cables or belts may be used to move the sled along the track, various stationary or rotating pulleys, guides, idlers, guide rails, pins, and cam followers may be used to guide the sled along the track, and so on. Accordingly, specific elements depicted and described herein are not intended to be limiting.

FIGS. 4A and 4B illustrate a sled moving through a corner portion of a track at maximum x-axis and y-axis positions. It is noted that sled 250 is not shown for illustrative purposes and only cam followers 252 and pin 248 associated with sled 250 are shown. FIG. 4A illustrates the sled at a maximum x-axis position, where pin 248 is adjacent to and vertically aligned with the corner guiding member 246c of the track. Pin 248 is illustrated within indentation 247 of guiding member 246c, thereby allowing a smooth transition of pin 248 around corner pulley 246c and reducing the radius of the turn. Additionally, cam followers 252 of sled 250 are adjacent curved portions of the guide members 240. As seen, the turning radius is relatively small compared to the dimensions of the sled, thereby allowing the sled to be positioned at or near the corner with little or no rotation and little or no swing clearance of sled 250 or associated gripper mechanism. Accordingly, components of the storage library for receiving or storing storage cartridges such as media drives and storage bins may be densely packed in the corner sections of the track and very little space within the library housing is lost due to the corner.

Belt 244 continues to drive sled 250 through the corner portion to the position shown in FIG. 4B. In this example, pin 248 is attached to cable 244 and rotates through the turn as shown. It will be understood, however, that various other methods for coupling the sled to a cable or belt with the drive system are possible.

FIG. 4B illustrates sled 250 at a maximum y-axis position over the corner portion of the track and accessing, e.g., a pass-through portion of a storage library, where pin 248 is adjacent to and horizontally aligned with the corner guiding member 246c of the track. Additionally, cam followers 252 of sled 250 are adjacent curved portions of guide members 240. As seen with reference to both FIGS. 4A and 4B access of sled 250 and a gripper mechanism associated therewith to storage device locations through the corner portion of the track is nearly uninterrupted by the corner portion of the track.

Figure 5A:
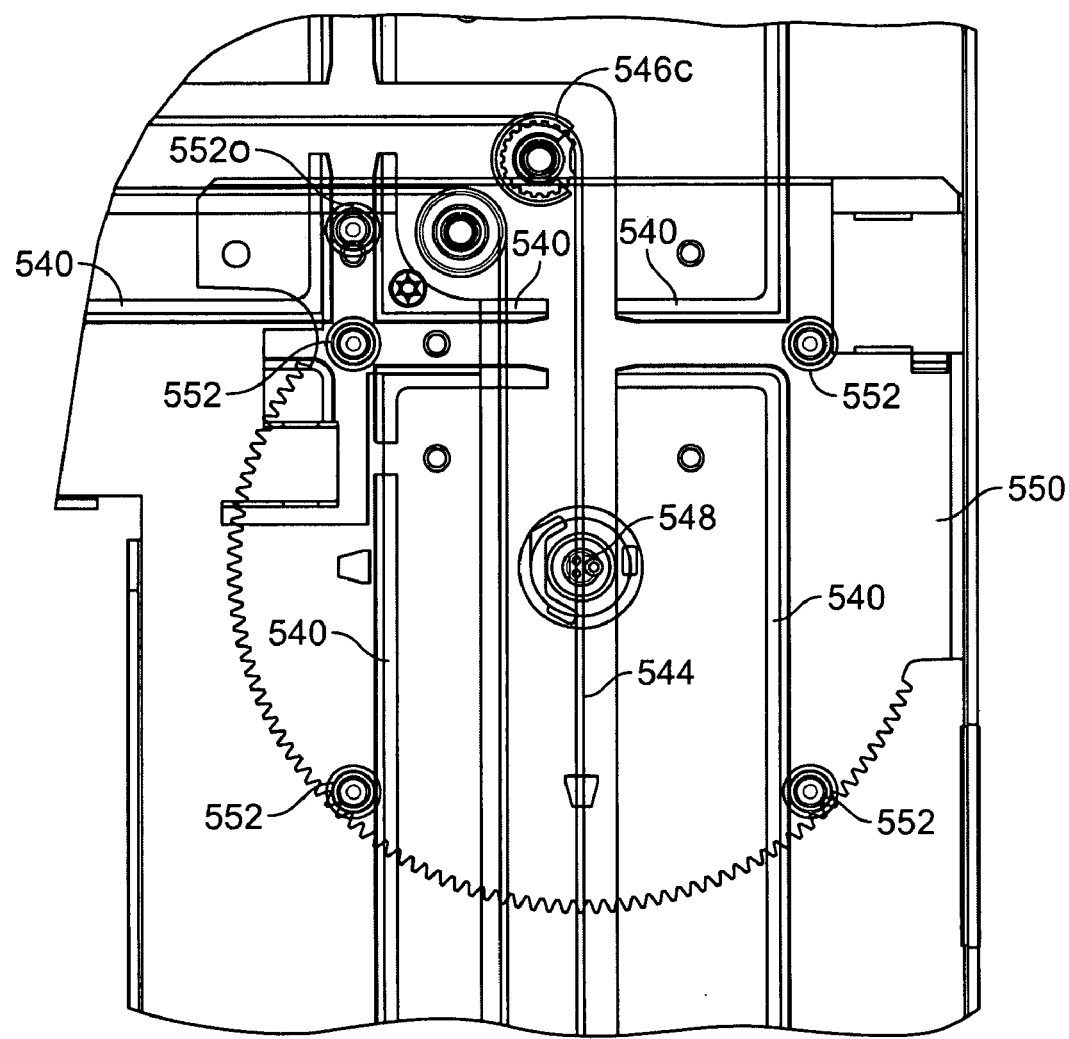
FIGS. 5A, 5B, and 5C illustrate schematic views of various guiding elements that may be included with a sled.
Figure 5B:
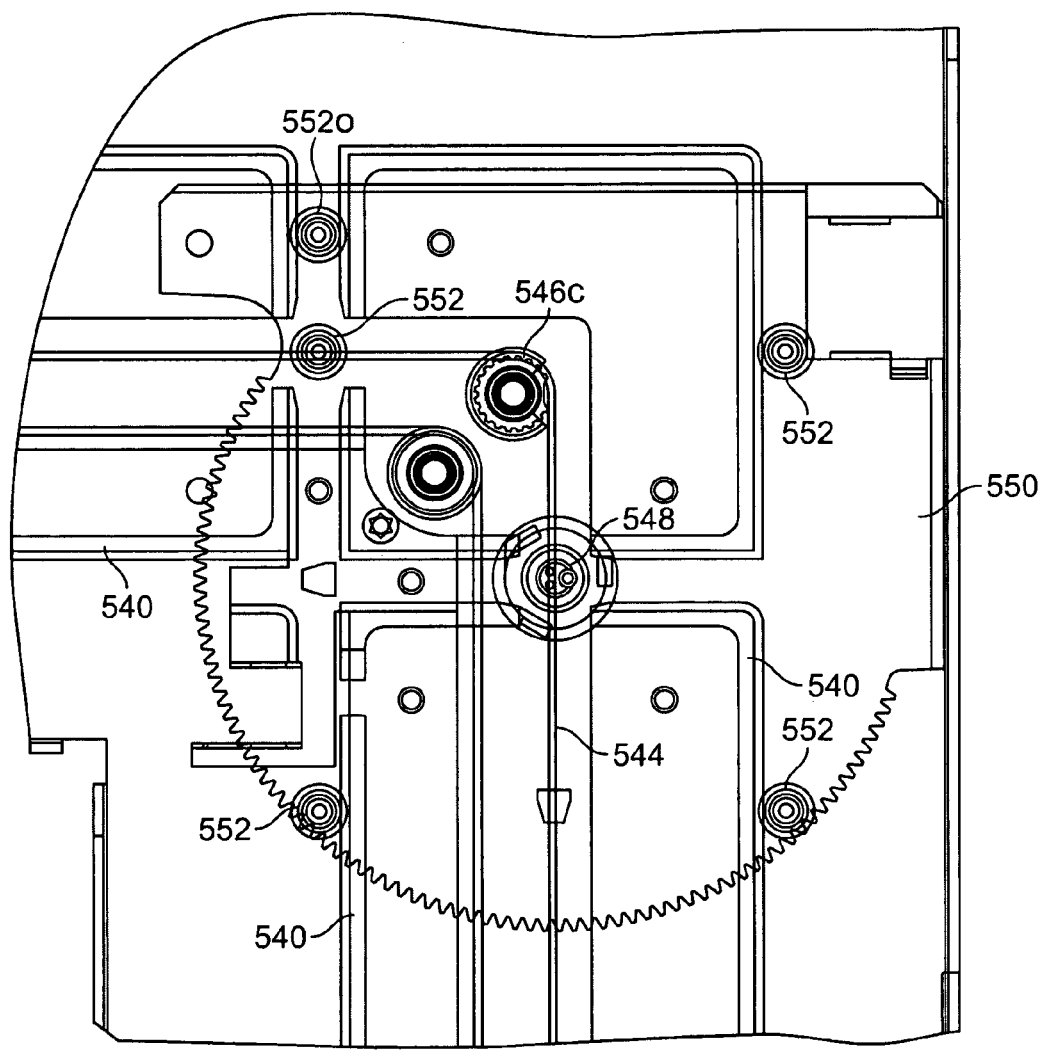
Figure 5C:
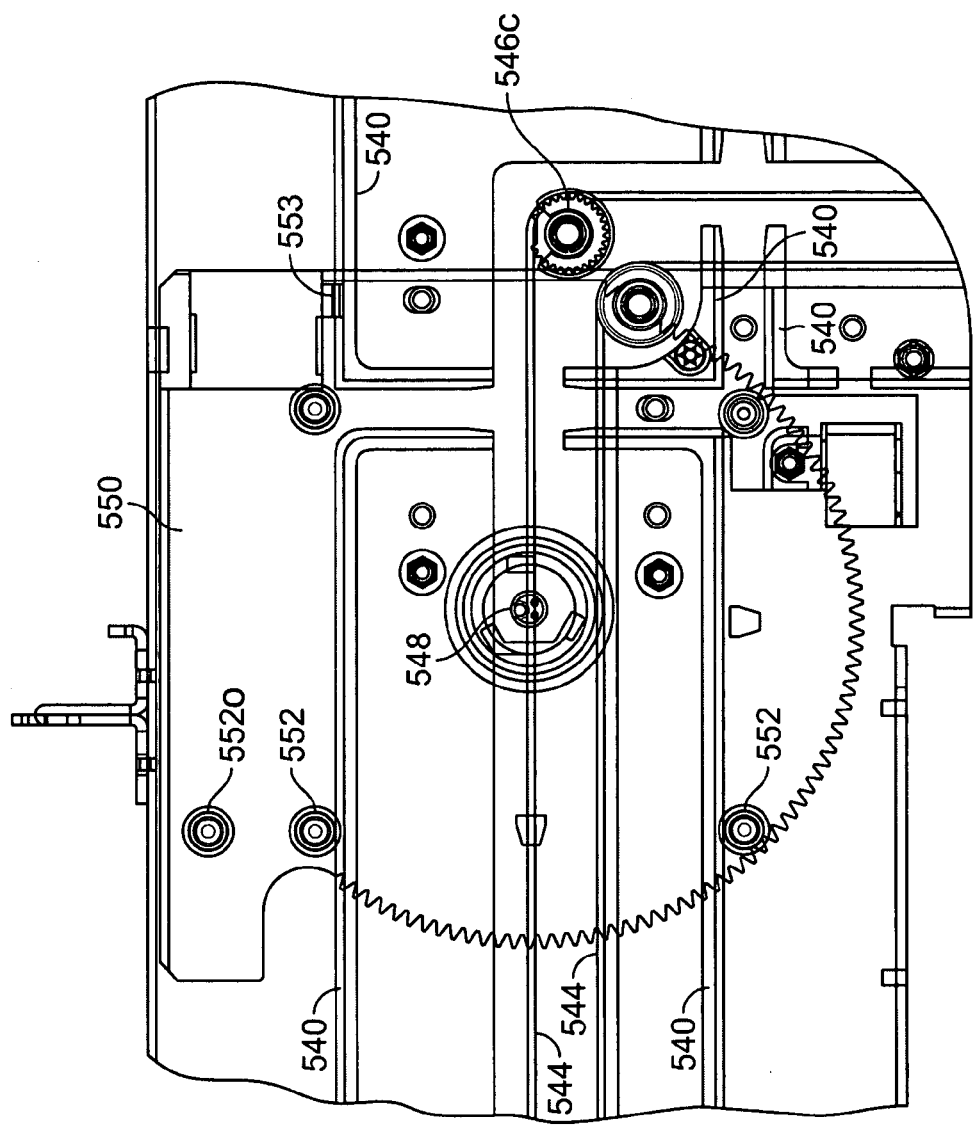

FIGS. 5A-5C illustrate various additional features that may be included with a sled to promote stability and secure movement of the sled through a corner portion of a track as described herein. In particular, FIG. 5A and 5B illustrate the operation of an outrigger or fifth cam follower 552o as belt 544 and pin 548 move sled 550 through openings in guide members 540 around corner pulley 546c. Cam follower 552o generally prevents or reduces the potential for rotation of sled 550 and cam followers 552 into inappropriate guide members 540 in the corner region. As shown, during movement along the track, the upper cam followers 552 may be situated adjacent to openings in guide members 540 for both x-axis and y-axis movement. This may result in instability of cam followers 552 and sled 550 as sled 550 approaches and is near the corner portion of the track. The addition of an outrigger element, such as cam follower 552o or other suitable device, provides stability through such portions of the track. Accordingly, the upper most cam followers 552 and sled 550 are guided, in part, by cam follower 552o in a vertical direction and the uppermost cam followers 552 are prevented from moving horizontally through openings in guide members 540 when sled 550 is positioned as shown.

FIG. 5B is largely similar to that of FIG. 5A, but illustrates the upper left cam follower 552 in another opening of guide members 540, which allows translation in both the x-axis and y-axis directions. Again, outrigger cam follower 552o assists in stabilizing motion of the sled 550 when one or more cam followers 552 are positioned adjacent multiple openings in guide members 540 of the track.

Additionally, FIG. 5C illustrates a guiding element 553 for engaging one or more of the guide members 540 of the track to further promote stability and secure movement through a corner portion. Guiding element 553 is similar to that shown in FIG. 3C (element 253) and may include a tab or ridge element having a lip or other suitable structure adapted to engage a portion of guide member 540. Sled 550 and cam followers 552 at times may be moving through openings in guide members 540 and have the potential, for example, to move vertically and disengage guide members 540. Such an instance is illustrated in FIG. 5C, where both the upper right and lower right cam followers 552 are aligned with openings in guide members 540 and may be momentarily disengaged from guide members 540 and the track. Guide element 553 is adapted to extend from sled 550 and engage guide members 540 to reduce the potential or prevent sled 550 and cam followers from disengaging guide members 540. Guide element 553 may engage guide member 540 during operation or be offset from guide members 540 to engage guide member 540 only if sled 550 and cam followers 552 are lifted from the track.

Various other devices and configurations may be used to ensure proper engagement of a sled to guiding members of a track. Suitable devices may vary depending on, e.g., the configuration of the track, sled, guiding members, and the like.

The above detailed description is provided to illustrate exemplary embodiments and is not intended to be limiting. It will be apparent to those of ordinary skill in the art that numerous modification and variations within the scope of the present invention are possible. For example, various motors, pulleys, cables, idlers, and the like may be used in the present examples. Additionally, particular examples have been discussed and how these examples are thought to address certain disadvantages in related art. This discussion is not meant, however, to restrict the various examples to methods and/or systems that actually address or solve the disadvantages. Accordingly, the present invention is defined by the appended claims and should not be limited by the description herein.

The invention claimed is:

1. An apparatus for transferring storage devices within an automated storage library, comprising:
   a sled;
   a frame having a track for supporting the sled;
   and a belt drive system for moving the sled along the track, wherein the track has a corner portion, and the sled is guided through the corner portion of the track without changing any orientation of the sled relative to the frame, and
   wherein the sled includes a gripper mechanism for engaging one or more storage devices, the gripper mechanism capable of rotation relative to the sled.

2. The apparatus of claim 1, wherein the sled is guided through the corner portion of the track in a substantially rectilinear motion.

3. The apparatus of claim 1, wherein the track further comprises a plurality of guide members for guiding a cable driven by a motor, wherein the cable is coupled to the sled to move the sled along the track.

4. The apparatus of claim 3, wherein the cable is coupled to the sled near a centroid of the sled.

5. The apparatus of claim 3, wherein a pulley disposed in the corner of the track includes a notch to accommodate a fastening member fixing the cable to the sled.

6. The apparatus of claim 3, wherein the motor is located remotely from the track.

7. The apparatus of claim 1, wherein the sled includes at least one element to engage and follow the track.

8. The apparatus of claim 7, wherein the sled includes 4 cam followers for engaging guide members of the track.

9. The apparatus of claim 8, wherein the sled includes a fifth cam follower for selectively engaging the guide members of the track.

10. The apparatus of claim 7, wherein the sled includes a guiding element for engaging a portion of the track if the at least one element to engage and follow the track becomes disengaged.

11. The apparatus of claim 1, wherein a turning radius of the corner portion is less than 7 mm.

12. An automated storage library system, comprising the apparatus of claim 1.

13. An apparatus for transferring storage devices within an automated storage library, comprising:
   a sled;
   a frame having a track for supporting the sled;
   and a belt drive system for moving the sled along the track, wherein the track has a corner portion, and the sled is guided through the corner portion of the track without changing any orientation of the sled relative to the frame, and
   wherein said track includes a first linear portion and a second linear portion that intersect at the corner.

14. The apparatus of claim 13, wherein first linear portion and the second linear portion are orthogonal with respect to each other.

15. An apparatus for transferring storage devices within an automated storage library, comprising:
   a sled;
   a frame having a track for supporting the sled;
   and a belt drive system for moving the sled along the track, wherein the track has a corner portion, and the sled is guided through the corner portion of the track without changing an orientation of the sled relative to the frame, wherein a pulley disposed in the corner of the track includes a notch to accommodate a fastening member fixing the cable to the sled.

16. An apparatus for transferring storage devices within an automated storage library, comprising:
   a sled;
   a frame having a track for supporting the sled;
   and a belt drive system for moving the sled along the track, wherein the track has a corner portion, and the sled is guided through the corner portion of the track without changing the horizontal orientation of the sled relative to the frame, and wherein the sled includes a gripper mechanism for engaging one or more storage devices, the gripper mechanism capable of rotation relative to the sled.

17. The apparatus of claim 16, wherein the sled is guided through the corner portion of the track in a substantially rectilinear motion.

18. The apparatus of claim 16, wherein the track further comprises a plurality of guide members for guiding a cable driven by a motor, wherein the cable is coupled to the sled to move the sled along the track.

19. The apparatus of claim 16, wherein said track includes a first linear portion and a second linear portion that intersect at the corner.

20. An automated storage library system, comprising the apparatus of claim 16.

* * * * *